United States Patent [19]

Wachtel

[11] 3,757,938
[45] Sept. 11, 1973

[54] METHOD OF REMOVING ULTRA FINE PHOSPHOR PARTICLES OF A $(ZN,MG)_2(SI,GE)_{O4}$: MN PHOSPHOR

[75] Inventor: Anselm Wachtel, Parlin, N.J.
[73] Assignee: Westinghouse Electric Corporation, Pittsburgh, Pa.
[22] Filed: Feb. 3, 1971
[21] Appl. No.: 112,187

[52] U.S. Cl.............. 209/5, 209/208, 117/33.5 L, 23/312 ME, 252/301.6 F
[51] Int. Cl............................................. B03d 3/00
[58] Field of Search.................. 209/208, 5, 160, 209/167; 252/301.4 F, 301.6 F; 23/312 ME; 117/33.5; 241/20, 21, 24

[56] References Cited
UNITED STATES PATENTS

| 2,987,144 | 6/1961 | Martyny | 117/33.5 L |
| 3,082,175 | 3/1963 | Thornton | 117/33.5 E |
| 3,273,806 | 9/1966 | Auki | 117/33.5 E X |
| 3,351,194 | 11/1967 | Butler | 209/160 X |
| 3,538,013 | 11/1970 | Graff | 252/301.4 P |

FOREIGN PATENTS OR APPLICATIONS

| 886,248 | 7/1953 | Germany | 252/301.4 F |

Primary Examiner—Frank W. Lutter
Assistant Examiner—Robert Halper
Attorney—A. T. Stratton, W. D. Palmer and D. S. Buleza

[57] ABSTRACT

Method of sizing a zinc-magnesium silico-germanate phosphor to remove the ultra fine particles to improve the performance of a discharge lamp, comprising suspending the finely divided prepared phosphor in an aqueous solution of ionizable aluminum compound or diethylenetriamine pentaacetic acid chelating agent, then settling the phosphor and removing the ultrafine particles which remain in suspension, and thereafter repeating the foregoing procedure with a water vehicle in order to remove remaining ultrafine particles and residual solute.

2 Claims, 1 Drawing Figure

Patented Sept. 11, 1973
3,757,938
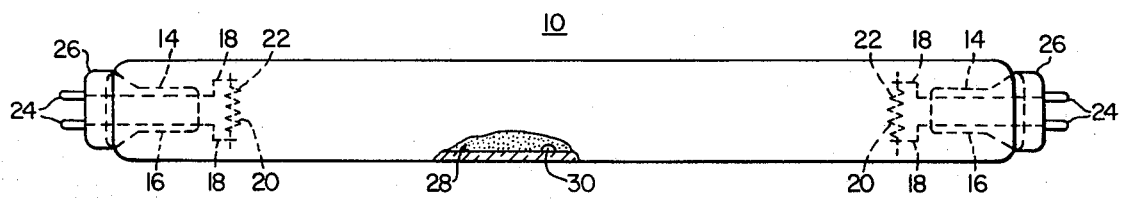
WITNESSES
Theodore F. Wrobel
James T. Young
INVENTOR
Anselm Wachtel
BY
W. D. Palmer
ATTORNEY

METHOD OF REMOVING ULTRA FINE PHOSPHOR PARTICLES OF A $(ZN,MG)_2 (SI,GE)O_4: MN$ PHOSPHOR

BACKGROUND OF THE INVENTION

The luminescent composition comprising zinc-magnesium silico-germanate is generally described in U.S. Pat. No. 3,458,452, dated July 29, 1969. This composition is efficiently excited by ultraviolet radiations to emit with a narrow band emission in the green portion of the visible spectrum, which makes it useful as a phosphor blend component in fluorescent lamps or for a fluorescent lamp which is desired to have a green emission color. The maintenance of initial light output of this phosphor is not as good as desired and it can be improved by the addition thereto of arsenic and lead, as is taught in copending application Ser. No. 834,971, filed June 20, 1969, and now abandoned and on which a continuation-in-part was filed, which continuation-in-part is now U.S. Pat. No. 3,644,212, issued Feb. 22, 1972, and owned by the present assignee.

In U.S. Pat. No. 3,538,013, issued Nov. 3, 1970 to E. A. Graff, is disclosed a method for improving halophosphate phosphor by treating the phosphor with diethylenetriamine pentaacetic acid. Briefly, this treatment involves washing the prepared phosphor with a solution of the specified acid.

SUMMARY OF THE INVENTION

The zinc-magnesium silico-germanate phosphor is prepared in finely divided form having a range of particle sizes. The prepared phosphor is suspended in a solution of aqueous vehicle having dissolved therein a predetermined amount of one of ionizable aluminum compound and an acid salt of diethylenetriamine pentaacetic acid which is a chelating agent. The pH of this solution is from 2.5 to 6. The suspended phosphor is settled in the solution for predetermined time sufficient to leave only a substantial portion of the ultrafine phosphor particles remaining in suspension. The settled phosphor is then separated from phosphor remaining in suspension, the settled and separated phosphor is resuspended in an aqueous medium, resettled and then separated from any phosphor remaining in suspension. This procedure is repeated as required to separate substantially all ultrafine phosphor particles from residual settled phosphor as well as to remove from the residual settled phosphor substantially all solute remaining from the initial solution. Thereafter the separated phosphor is dried and coated onto a discharge lamp envelope.

BRIEF DESCRIPTION OF THE DRAWING

For a better understanding of the invention, reference may be had to the sole FIGURE of the drawing which illustrates a fluorescent lamp coated with phosphor treated in accordance with the present invention.

DESCRIPTION OF THE PREFERRED EMBODIMENT

With reference to the lamp shown in the drawing, the numeral 10 illustrates generally a 40 watt fluorescent lamp comprising a tubular vitreous envelope 12 which is fabricated of soda-lime-silicate glass, for example, having mounts 14 sealed into either end thereof, as is customary. Each mount comprises a vitreous portion 16 sealed to the ends of the envelope 12 with lead-in conductors 18 sealed therethrough and supporting refractory metal coils 20 at their inwardly extending extremities. The coils 20 are usually fabricated of tungsten with a coiled-coil construction, as is known in the art. Contained within the turns of the inner coil is an electron-emitting material 22. Electrical connection for the lead-in conductors is provided by contact pin 24 which project from supporting base caps 26 at either end of the lamp. The envelope 12 has coated on its inner surface a phosphor material 28 which in accordance with the present invention is zinc-magnesium silico-germanate phosphor activated with manganese, used either as a single coating constituent or as a constituent of a blend of phosphor materials, and this phosphor has been treated in accordance with the present invention prior to coating onto the lamp envelope. As is conventional, the envelope also encloses a small filling of argon or other inert ionizable gas in order to facilitate starting as well as a small charge of mercury 30, as is customary. In the operation with such a lamp, the phosphor material 28 is excited by the 254 nm resonant radiation of the mercury discharge to produce visible light.

The zinc-magnesium silico-germanate phosphor composition is initially prepared by thoroughly mixing the following finely divided luminescence grade constituents: 1.7 mole ZnO, 0.3 mole $MgF_2$, 0.6 mole of $GeO_2$, 0.4 mole of $SiO_2$, and 0.03 mole of $MnCO_3$, $10^{-3}$ mole of arsenic oxide and about $4 \times 10^{-4}$ mole of lead oxide. The raw mix is fired at about 1200°C for about 4 hours in order to prepare the phosphor. After firing, the phosphor is cooled and milled in a conventional ball mill to a degree such that the particles will pass through a standard 400 mesh screen. Such a milling procedure will produce a range of different particle sizes, including some ultrafine particles which have a diameter less than about one micron.

In accordance with the present invention, a 0.05 molar solution of an acid salt of diethylenetriamine pentaacetic acid (DTPA) is first prepared. The pH of the diethylenetriamine pentaacetic acid solution is adjusted by adding with the acid a small amount of alkali metal hydroxide or carbonate, for example sodium carbonate, in order to adjust the pH of the resulting solution from 2.5 to 6. Preferably the Ph of the solution is about 3.5, and this solution functions as a chelating agent. By way of example 250 grams of the finely divided luminescent composition is dispersed in about one liter of the prepared DTPA solution and the finely divided phosphor is thoroughly dispersed in the DTPA solution by stirring in a container having a height of approximately six inches. The suspended phosphor is allowed to settle for approximately ten minutes, so that only a substantial portion of the ultrafine phosphor particles remain suspended in the DTPA solution. The supernatant liquid which contains the unsettled ultrafine particles is then decanted from the settled material. The settled phosphor is resuspended in distilled water, resettled and separated as before the procedure repeated as required to separate substantially all ultrafine phosphor particles from the residual settled phosphor, as well as to remove from the residual settled phosphor substantially all acid-salt solute which was present in the initial settling solution. As a specific example, for a water column height as used herein, the resuspension and resettling procedure is repeated five times. Thereafter, the residual separated phosphor is dried, and coated onto the lamp envelope in accordance with conventional lamp making techniques.

The foregoing DTPA can be replaced by ionizable aluminum compound such as aluminum nitrate, for example, with the molarity of the alumunum nitrate solution being maintained the same as the acid-salt solution. Such an aluminum nitrate solution will have a pH of at least 2.5.

The molarity of the initial settling solution is maintained at from 0.01 to 1, with higher concentrations being uneconomical. The preferred molarity is from 0.05 to 0.1. In the case of the acid salt settling solution, it has been found desirable to incorporate with the diethylenetriamine pentaacetic acid approximately an equimolar amount of disodium mono-hydrogen ortho-phosphate.

The action of the foregoing electrolytes appears to be associated with a modification of the electrical nature of the phosphor-liquid interface to cause the phosphor to deagglomerate with the ultrafine phosphor particles remaining in solution so that they may be readily separated. These electrolytes may also have some beneficial effect with respect to dissolving unreacted constituents which remain in the prepared phosphor. While the results vary somewhat from lamp to lamp, the usual improvement in initial lumens for fluorescent lamps coated with phosphor treated in accordance with the present invention will vary from 6 to 19 percent over the control lamps which incorporate untreated phosphor.

A further improvement in the so-called maintenance of the fluorescent lamp which incorporates treated phosphor has been obtained by twice suspending the phosphor in the solutions, settling and then separating. In such a procedure, the phosphor is initially suspended in the DTPA solution, settled and separated and thereafter suspended in the aluminum compound solution, settled and then separated, with the phosphor water washed between the individual suspensions in order to remove any residual solute. Alternately, the procedure can be reversed with the phosphor first suspended in the DTPA solution and thereafter suspended in the aluminum compound solution. Best results to data have been achieved by first suspending in the aluminum compound solution and then in the DTPA solution. This provided an initial lumen output for the fluorescent lamp which was more than 19 percent greater than the control lamps, with the maintenance of initial light output measured at 100 hours being 95 percent.

I claim:

1. The method of sizing finely divided particles of a zinc-magnesium silico-germanate phosphor to remove ultra fine particle sizes having a diameter less than one micron to improve the performance of a discharges lamp, comprising:

a. after said phosphor is prepared in finely divided form having a range of particle sizes such that all particles will pass through a standard 400 mesh screen and including ultrafine particles having a diameter less than about one micron, but before incorporation in a discharge lamp, twice suspending said phosphor in a solution of aqueous vehicle having a pH from about 2.5 to 6 and having dissolved therein a predetermined amount of one of ionizable aluminum compound or diethylenetriamine pentaacetic acid (DTPA);

b. twice settling said phosphor in said solution for a predetermined period sufficient to leave only a substantial portion of the ultrafine phosphor particles remaining suspended therein;

c. twice separating said settled phosphor from phosphor remaining suspended in said solution; in the first said suspension, settling and separation, said solution is said aluminum compound; and in the second said suspension, settling and separation, said solution is said DTPA; and intermediate said first suspension and said second suspension, said phosphor is water washed to remove residual solute; and d. resuspending said separated phosphor in aqueous medium, resettling and then separating settled phosphor, and repeating this procedure as required to separate substantially all ultrafine phosphor particles from residual settled phosphor as well as to remove from residual settled phosphor substantially all solute remaining from said solution.

2. The method of sizing finely divided particles of a zinc-magnesium silico-germanate phosphor to remove ultra fine particle sizes having a diameter less than one micron to improve the performance of a discharges lamp, comprising:

a. after said phosphor is prepared in finely divided form having a range of particle sizes such that all particles will pass through a standard 400 mesh screen and including ultrafine particles having a diameter less than about one micron, but before incorporation in a discharge lamp, twice suspending said phosphor in a solution of aqueous vehicle having a pH from about 2.5 to 6 and having dissolved therein a predetermined amount of one of ionizable aluminum compound or diethylenetriamine pentaacetic acid (DTPA);

b. twice settling said phosphor in said solution for a predetermined period sufficient to leave only a substantial portion of the ultrafine phosphor particles remaining suspended therein;

c. twice separating said settled phosphor from phosphor remaining suspended in said solution; in the first said suspension, settling and separation, said solution is said DTPA; and in the second said suspension, settling and separation, said solution is said aluminum compound; and intermediate said first suspension and said second suspension, said phosphor is water washed to remove residual solute; and d. resuspending said separated phosphor in aqueous medium, resettling and then separating settled phosphor, and repeating this procedure as required to separate substantially all ultrafine phosphor particles from residual settled phosphor as well as to remove from residual settled phosphor substantially all solute remaining from said solution.

* * * * *